Patented Aug. 29, 1933

1,924,752

UNITED STATES PATENT OFFICE 1,924,752

HEAT RESISTING GLASS GIVING DAYLIGHT EFFECTS

Walter H. Rising, Painted Post, N. Y., assignor to Corning Glass Works, Corning, N. Y., a corporation of New York No Drawing. Application September 3, 1929
Serial No. 390,217

6 Claims. (Cl. 106—36.1)

In my prior patent 1,737,685, dated Dec. 31, 1929, I have disclosed a heat resisting borosilicate glass characterized by the fact that a batch containing zinc or cadmium and iron is melted under reducing conditions preferably by adding carbon or carbonaceous material to the batch whereby the property of absorption of the infrared together with a high transmission of the blue is given to a heat resisting glass.

The glass of that patent is a blue green in color and when used in connection with artificial light sources produces an illumination lacking in the characteristics of sunlight. I have discovered that by adding cobalt to a glass of the composition above referred to in which a proper relation of iron and cobalt contents is observed, a transmission having daylight effects is produced. As far as I know this has not been possible in any previous low expansion borosilicate glass by the simple addition of cobalt.

The following are examples of glass batches which when properly melted result in glasses falling under this application.

|  | A | B | C |
|---|---|---|---|
| Sand | 378. | 378. | 378. |
| Soda ash | 51. | 51. | 51. |
| Boric acid | 80. | 80. | 80. |
| Zinc oxide | 30. | 30. | 30. |
| Hydrated lime | 13. | 13. | 13. |
| Alumina | 7.5 | 7.5 | 7.5 |
| Ferrous oxalate | 4.125 | 2.5 | 6.25 |
| Cobalt oxide | .2 | .25 | .156 |
| Carbon | 5. | 5. | 5. |

The above batches contain carbon to insure reducing conditions during melting.

The percentage composition of the resulting glasses as calculated from the above batches would be:

|  | A | B | C |
|---|---|---|---|
| $SiO_2$ | 75.6 | 75.6 | 75.6 |
| $Na_2O$ | 6. | 6. | 6. |
| $B_2O_3$ | 9. | 9. | 9. |
| $ZnO$ | 6. | 6. | 6. |
| $CaO$ | 2. | 2. | 2. |
| $Al_2O_3$ | 1. | 1. | 1. |
| $FeO$ | .33 | .2 | .5 |
| $CoO$ | .04 | .05 | .0313 |
| Ratio FeO/CoO | 8/1 | 4/1 | 16/1 |
| Heat transmission (6 mm) | 13.2 | 20.5 | 8.3 |

Cadmium oxide may be used in place of zinc oxide, and any of the glasses disclosed in my aforesaid prior patent with the addition of cobalt and a proper selection of the ratio of iron to cobalt content will give the desirable daylight effects.

I designate in the following claims by the term, "a metallic element of the second periodic group having an atomic weight between 60 and 120", either zinc, cadmium or a mixture thereof and the term, "alkaline earth elements", is used by me to designate only magnesium, calcium, strontium, and barium.

Having thus described my invention, what I claim as new and desire to secure by Letters Patent is:

1. A sodium borosilicate glass containing an oxide of the metallic elements of the second periodic group having an atomic weight between 60 and 120 and also containing cobalt, and containing ferrous oxide.

2. A sodium borosilicate glass containing zinc, and cobalt and ferrous oxide.

3. A sodium borosilicate glass containing an oxide of the metallic elements of the second periodic group having an atomic weight between 60 and 120, cobalt and ferrous oxide, the ratio of ferrous oxide to cobalt oxide being between four to one and sixteen to one.

4. A sodium borosilicate glass containing zinc, cobalt, and ferrous oxide, the ratio of ferrous oxide to cobalt oxide being between four to one and sixteen to one.

5. A sodium borosilicate glass containing an alkaline earth oxide, an oxide of the metallic elements of the second periodic group having an atomic weight between 60 and 120, cobalt and ferrous oxide, the amount of the alkaline earth oxide not exceeding the amount of the oxides of the metallic elements.

6. A sodium borosilicate glass containing an alkaline earth oxide, zinc oxide, cobalt oxide and ferrous oxide, the amount of the alkaline earth oxide not exceeding the amount of the zinc oxide, and the ratio of ferrous oxide to cobalt oxide being between four to one and sixteen to one.

WALTER H. RISING.